US011958060B2

(12) United States Patent
Vandenbelt et al.

(10) Patent No.: US 11,958,060 B2
(45) Date of Patent: Apr. 16, 2024

(54) PERSONAL RECHARGEABLE PORTABLE IONIC AIR PURIFIER

(71) Applicant: HEADWATERS, INC., Marblehead, MA (US)

(72) Inventors: Rudy A. Vandenbelt, Ottawa (CA); Philippe J. Genereux, Ottawa (CA); Adam T. Clarke, Ottawa (CA)

(73) Assignee: Headwaters Inc, Marblehead, MA (US)

( * ) Notice: Subject to any disclaimer, the term of this patent is extended or adjusted under 35 U.S.C. 154(b) by 13 days.

(21) Appl. No.: 17/352,544

(22) Filed: Jun. 21, 2021

(65) Prior Publication Data

US 2021/0308693 A1 Oct. 7, 2021

Related U.S. Application Data

(62) Division of application No. 15/914,036, filed on Mar. 7, 2018, now Pat. No. 11,040,354.

(51) Int. Cl.

*B03C 3/38* (2006.01)
*B03C 3/04* (2006.01)
*B03C 3/32* (2006.01)
*B03C 3/41* (2006.01)
*H01T 23/00* (2006.01)

(52) U.S. Cl.

CPC .................. *B03C 3/38* (2013.01); *B03C 3/04* (2013.01); *B03C 3/32* (2013.01); *B03C 3/41* (2013.01); *H01T 23/00* (2013.01); *B03C 2201/30* (2013.01)

(58) Field of Classification Search

CPC .... B03C 3/38; B03C 3/04; B03C 3/32; B03C 3/41; B03C 2201/30; H01T 23/00; H01T 19/00

See application file for complete search history.

(56) References Cited

U.S. PATENT DOCUMENTS 4,713,724 A * 12/1987 Voelkel .................... A61N 1/44 128/202.25
4,941,068 A * 7/1990 Hofmann ................. A61N 1/44 128/202.25
5,484,472 A * 1/1996 Weinberg .................. B03C 3/66 96/80
5,749,359 A * 5/1998 Hansen ................... F24F 8/158 128/202.25
5,814,135 A * 9/1998 Weinberg .................. B03C 3/38 323/903
5,861,127 A * 1/1999 Yeh ........................ A62B 11/00 422/123
6,042,637 A * 3/2000 Weinberg .................. B03C 3/38 96/97

(Continued)

FOREIGN PATENT DOCUMENTS

WO WO-2015191404 A1 * 12/2015 ............... B03C 3/02

*Primary Examiner* — Christopher P Jones
*Assistant Examiner* — Sonji Turner
(74) *Attorney, Agent, or Firm* — Albert Peter Durigon

(57) ABSTRACT

A portable rechargeable personal ionic air purifier energizing a personal airspace and cleaning particulate pollutants therefrom provides removable attachment of ion emitter and housing subassemblies by magnetic attraction, provides an electrically grounded conductive member external to the housing that releasably clips a lanyard or article of clothing, includes a decorative surround and provides an external ground plate for use with a desktop mount, armband or other accessory.

6 Claims, 5 Drawing Sheets

(56) References Cited

U.S. PATENT DOCUMENTS

| | | | | |
|---|---|---|---|---|
| 6,632,407 | B1 * | 10/2003 | Lau | C01B 13/115<br>422/186 |
| 6,850,403 | B1 * | 2/2005 | Gefter | H01T 23/00<br>361/230 |
| 6,896,853 | B2 * | 5/2005 | Lau | B03C 3/32<br>422/186 |
| 7,767,165 | B2 * | 8/2010 | Lau | C01B 13/115<br>422/186.04 |
| 7,995,322 | B2 * | 8/2011 | Shaw | H01T 23/00<br>361/231 |
| 8,809,802 | B2 * | 8/2014 | Sung | H01T 23/00<br>361/230 |
| 9,205,218 | B1 * | 12/2015 | Bachan | A61M 16/105 |
| 2005/0188987 | A1 * | 9/2005 | Yuen | B03C 3/32<br>128/202.25 |
| 2010/0307332 | A1 * | 12/2010 | Yuen | B03C 3/383<br>96/25 |
| 2011/0126828 | A1 * | 6/2011 | Wu | B03C 3/155<br>128/205.12 |
| 2019/0123518 | A1 * | 4/2019 | Black | B03C 3/41 |

* cited by examiner

PERSONAL RECHARGEABLE PORTABLE IONIC AIR PURIFIER

CROSS-REFERENCE TO RELATED INVENTIONS

This application is related to U.S. Pat. No. 9,737,895 entitled Personal Rechargeable Portable Ionic Air Purifier, issued Aug. 22, 2017 to Genereux et al.; to U.S. Pat. No. 7,215,526 entitled Ion Generator with Open Emitter and Safety Feature, issued May 8, 2007 to Joannou; and to U.S. Pat. No. 6,919,053 entitled Portable Ion Generator and Dust Collector, issued Jul. 19, 2005 to Joannou, each incorporated herein by reference and is a divisional application of allowed U.S. utility application Ser. No. 15/194,036 of the same inventive entity as herein and incorporated herein by reference.

FIELD OF THE INVENTION

The present invention relates to ion generators, and more particularly, to battery-operated portable ion generators for personal use and for air purification.

BACKGROUND OF THE INVENTION

Portable ionic air purifiers are called upon to controllably provide ions to energize and to clean a polluted personal airspace such as that of a taxicab or airplane cabin or other environ of viruses, pollen, smoke, mold, dust mites, and other particulate pollutants while posing little or no personal shock risk, and among other things to exhibit a long battery life and to be manufacturable at low cost. Genereux et al., U.S. Pat. No. 9,737,895, entitled Personal Rechargeable Portable Ionic Air Purifier, discloses a high-efficiency ionization circuit, lanyards that plug-in to portable housing to establish them at ground potential, and different protectable ion emitter embodiments. Joannou, U.S. Pat. No. 7,215,526, entitled Ion Generator with Open Emitter and Safety Feature, discloses an ion emitter, a safety circuit and an analog ionization circuit, and Joannou, U.S. Pat. No. 6,919,053, entitled Portable Ion Generator and Dust Collector, discloses, among other things, a pendant pin emitter on a housing and an energization circuit.

The plug-in lanyards of Genereux et al. include plugs that at each of its ends plug into mating receptacles provided therefor on the portable housing thereof by means of which the lanyard is removably attached to the housing and electrically grounded. The plugs carried by the lanyard, and/or their mating receptacles, however, are subject to soiling and/or deformation from handling and use which may result in poor connectivity or failure to achieve the requisite mechanical attachment or to establish the lanyard at ground potential. In addition, the specialized plug and receptacle hardware not only adds to material costs but also precludes the use of any lanyards except specialized lanyards having plug ends.

The protectable ion emitter embodiments of Genereux et al. allow the replacement of ion emitters that are consumed in use and include different movable cover and slide embodiments to protect the ion emitter when not in use to prevent unwanted contact with the ion emitter that may result in damage and/or impaired operability. The different movable cover and slide embodiments disclosed therein, however, are subject to deformation from handling and use which may result in sticking or other loss of functionality with the result of poor or failed ion emitter protection. In addition, the movable cover and slide embodiments disclosed therein add to material and manufacturing costs undesirably increasing overall product costs.

SUMMARY OF THE INVENTION

One object of the present invention is to disclose a personal rechargeable portable ionic air purifier having a lanyard by which it is worn that is plug-less and not subject to soiling and/or deformation induced mechanical attachment or electrical grounding failure.

In accord therewith, the personal air space cleaner of the present invention includes a wearable housing having external surfaces and of such dimension and weight as to be comfortable when worn; an electronic circuit that is powered by battery power and that provides both a ground potential and an excitation potential; an ion emitter connected to said electronic circuit that is excited to emit ions when it is energized at said excitation potential; a conductive lanyard; and a conductive member electrically connected to said ground potential and mechanically connected to said wearable housing that extends externally to said external surfaces thereof and is adapted to receive the lanyard and to removably attach it to said wearable housing to which said conductive member is mechanically connected, thereby electrically grounding the lanyard by contact with said conductive member electrically connected to said ground potential when said lanyard is received thereby.

In one presently preferred embodiment, the conductive member is a resiliently biased jaw attached to the housing that is adapted to resiliently open so as to receive the lanyard between it and the confronting surface of the housing and to resiliently close so as to capture it between the jaw and the confronting surface of the housing, thereby electrically grounding the wearer's body when the wearable housing is supported about the neck by said lanyard captured by said jaw provided by said conductive member electrically connected to said ground potential.

The jaw of the presently preferred embodiment of the conductive member external to said wearable housing may also be used to attach to an article of clothing.

Any conductive member geometry so long as it captures and electrically grounds the lanyard externally of the housing and supports the housing about the head and neck and/or provides for housing attachment to articles of clothing and the like may be employed.

Another object of the present invention is to disclose a personal rechargeable portable ionic air purifier that provides for ion emitter protection when not in use and ion emitter replacement without requiring movable covers or slides or other moving parts and that is not subject to deformation or sticking.

In accord therewith, the personal air space cleaner of the present invention includes a wearable housing subassembly of such dimension and weight as to be comfortable when worn having external surfaces and including an electronic circuit that is powered by battery power that provides an excitation potential; a first member mounted to one of said surfaces of said wearable housing; an ion emitter subassembly having external surfaces and an ion emitter that is excited to emit ions when it is energized at said excitation potential; a second member mounted to one of said surfaces of said ion emitter subassembly; wherein at least one of said first and second members magnetically attracts the other of said first and second members; and wherein said second member mounted to one of said surfaces of said ion emitter subassembly cooperates with said first member mounted to one of said surfaces of said wearable housing subassembly to removably mount said ion emitter subassembly to said wearable housing subassembly by action of magnetic attraction of the first and second members.

In one presently preferred embodiment, said first and said second members are of conductive material, said first member of conductive material is connected to receive said excitation potential provided by said electronic circuit, said second member of conductive material is connected to said ion emitter, and said first and second conductive members supply said ionization potential to said ion emitter by conduction through said first and second members when said ion emitter subassembly is mounted to said wearable housing subassembly by action of magnetic attraction of the first and second conductive members.

BRIEF DESCRIPTION OF THE DRAWINGS

These and other objects, advantages features and inventive aspects of the present invention will become apparent as the invention becomes better understood by reference to the following detailed description of the presently preferred embodiments thereof, and to the drawings, wherein.

DETAILED DESCRIPTION OF THE PRESENTLY PREFERRED EMBODIMENTS

Figure 1:
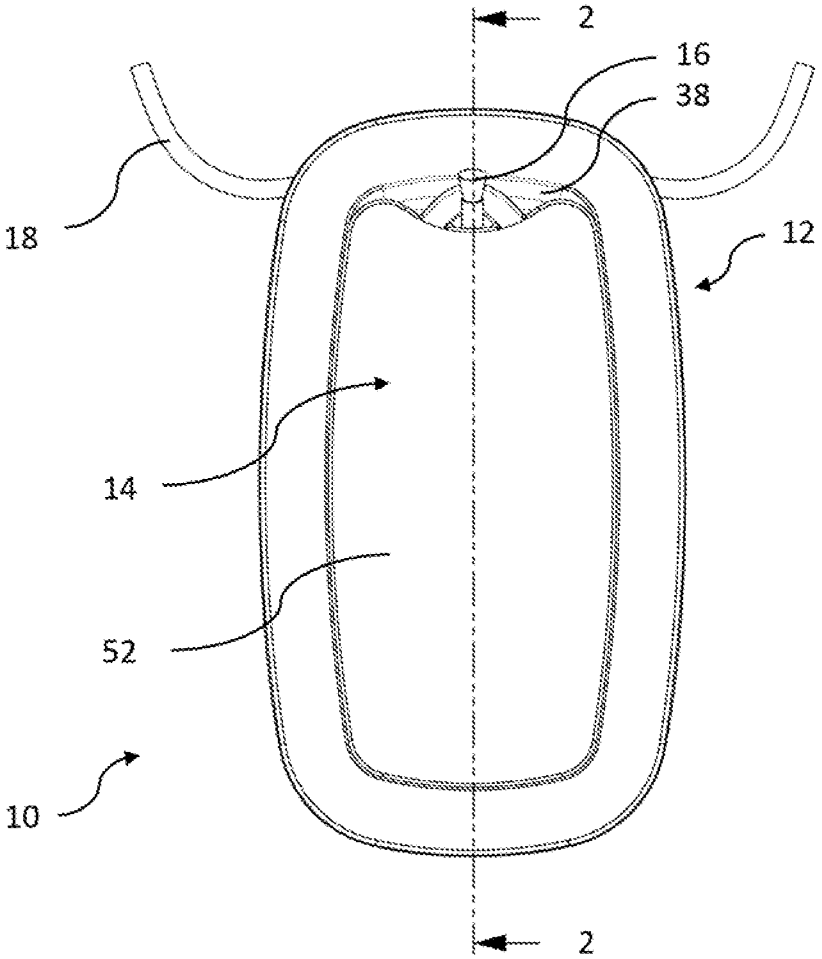
FIG. 1 is a front pictorial view of a portable rechargeable personal ionic air purifier in accord with the present invention.

It is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Turning now descriptively to the drawings, in FIG. 1 illustrated generally at 10 is the portable, rechargeable, personal ionic air purifier 10 of the present invention. The purifier 10 includes a wearable housing subassembly generally designated 12 of material, weight, construction and dimension adapted to be comfortably worn and/or personally carried without any noticeable burden. An ion emitter subassembly generally designated 14 is removably mounted in a manner to be described to the wearable housing subassembly 12. The ion emitter subassembly 14 includes a carbon brush 16. The user hangs the purifier 10 around their neck using a conductive cord or lanyard 18 mounted in a manner to be described to the wearable housing subassembly 12 and turns the purifier 10 "on" using a switch, not shown. A cloud of ions, also not shown, is thereby produced off of carbon brush 16 or other ion emitter directed towards the facial area, not shown, to energize the personal airspace with ions and remove particulates therefrom. These ions attract opposite charged particles in the air and are then attracted together towards the nearest ground source. The conductive cord 18 ensures that the ground source is the body of the user and not the breathable air stream, thus effectively cleaning the breathable air stream of contaminants in the air and/or producing negative ions.

The purifier 10 cleans the air, typically about a three-foot sphere about the head when the purifier is worn about the neck using the lanyard 18, of viruses, pollen, smoke, mold, dust mites and other particulate-pollutants. The purifier can also be placed, for example, on a night stand, so that the air around the pillow area is purified of pollutants, or located nearby on a table, seat or anywhere else energization by negative ions and/or purification may be desired or necessary. An armband, wristband and the like may be used to mount the device 10 to the body in lieu of the lanyard in a manner to be described.

It is known from U.S. Pat. No. 6,919,053 that a grounded surface in proximity of a high voltage ion source increases the production of ions. Ideally an electrical connection is formed between the ground terminal of the high voltage source and the surface in question. In the case of a personal air purifier, this connection can be achieved through a conductive fabric lanyard which is in contact with the user's skin. The fabric is ideally composed of ordinary fabric with conductive elements interweaved. The conductive elements produce an electrical connection between the user and one side of a high voltage power circuit output providing an energization signal at ionization potential. The conductivity of the fabric can be achieved using a multitude of methods, some of which will desirably provide a more comfortable user experience than others. As appears more fully below, the purifier 10 of the instant invention may also employ an otherwise ordinary metal necklace such as of gold or silver in a manner to be described.

The conductive grounding neck strap allows for the device to use the body of the person wearing the purifier as a ground source. This has the effect of providing a large ground plane and a significant increase in ion output from the purifier. The strap is generally of cotton construction with interwoven layers of conductive materials. It is connected directly to the floating ground in the device and concurrently to the individual user while hanging around the neck and/or in contact with bare skin.

The ground cord may be constructed of any type of conductive materials. A ground plate in contact with the body of the user to be described may be used in a desk mount or a bedstead, arm or wrist band or other mounting embodiments. Other grounding means may also be employed.

Figure 2:
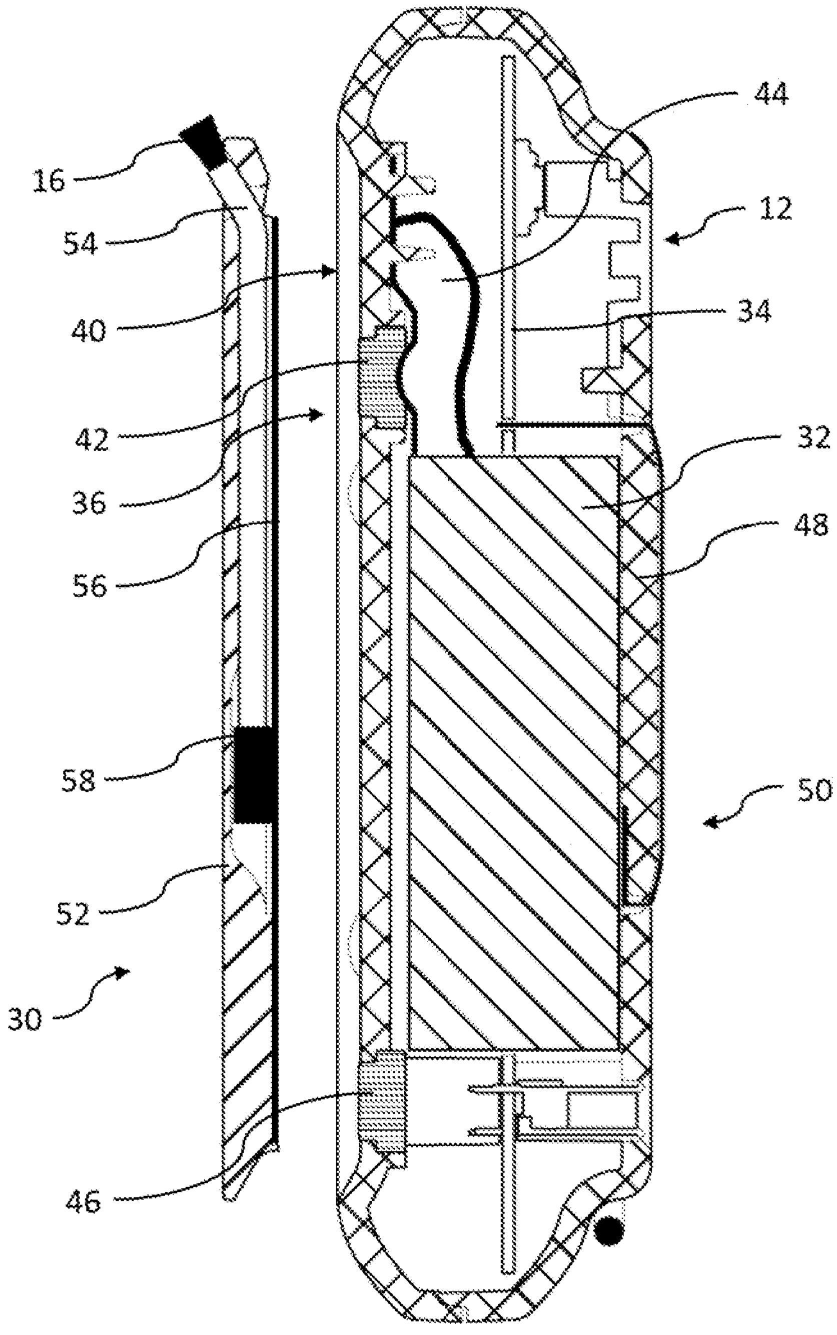
FIG. 2 is an exploded sectional view of the portable rechargeable personal ionic air purifier in accord with the present invention taken along the lines 2-2 of FIG. 1.

Referring now to FIG. 2, generally designated at 30 is an exploded sectional view of the portable rechargeable personal ionic air purifier in accord with the present invention taken along the lines 2-2 of FIG. 1. The wearable housing subassembly 12 includes a battery 32 and printed circuit board 34 mounted therewithin. The battery 32 supplies the electrical circuitry carried by the circuit board 34 with power. The circuitry defines electrical ground and provides an output signal at ionization potential. Any suitable electrical circuitry to convert the battery power to ionization potential such as the safe, and high-efficiency, electrical circuitry shown and described in U.S. Pat. No. 9,737,895, incorporated herein by reference, may be employed to controllably energize the ion emitter 16 to safely emit ions at ionization potential. Non-rechargeable battery sources may also be used for operation of this purifier.

The wearable housing subassembly 12 includes a front surface generally designated 36 having a peripheral wall 38

(best seen in FIG. 1) defining a recess generally designated 40 and a high-voltage magnet 42 mounted to the housing 12 flush with the recessed surface 40 thereof. A high-voltage wire connector 44 connects the signal at ionization potential produced by the high-voltage circuitry 34 to the high-voltage magnet 42. A magnet 46 is mounted to the housing 12 flush with the recessed surface 40 in spaced-apart relation to the magnet 42. A ground plate 48 is mounted to the rear surface generally designated 50 of the wearable housing subassembly 12.

The ground plate 48 is of conductive material and is electrically connected to ground potential. The ground plate 48 preferably protrudes such that ground is readily accessible when the housing 12 is received in an armband or wristband or other accessory to hold it in contact with the body. It is also an efficient way to transfer ground to other accessories such as desk or bed mounts.

Referring now to FIGS. 1 and 2, the ion emitter subassembly 14 includes a generally flat cover member 52 dimensioned to fit into the recess 40 of the wearable housing subassembly 12. An elongated carbon brush wire 54 is mounted to the cover member 52 such that brush 16 is exposed at its distal end at the top of the cover member 52. The proximate end of the elongated carbon brush wire 54 is mechanically and electrically connected to a magnetic material conductive contact plate 56 by solder or weld 58. The magnetic material conductive contact plate 56 is itself adhesively or otherwise fastened to the inside surface of the cover member 52.

When the subassembly 14 is inserted in the recess 40 provided therefor in the wearable housing subassembly 12, the conductive magnetic members 42, 46 contact the conductive magnetic member 56. As will be readily appreciated by those of skill in the art, on the one hand, the ion emitter subassembly 14 is thereby removably attached to the wearable housing subassembly 12, by action of the magnetic attraction that subsists therebetween, and on the other hand, the ion emitter 16 is energized at ionization potential, by completion of an electrical circuit defined between the brush 16, crimp 58, conductive magnetic plate 56, and conductive magnet connected via the high voltage wire connector 44 to ionization potential at the high-voltage output of the ion energization circuit carried by the printed circuit board 34.

Whenever the carbon brush 16 becomes consumed, the ion emitter subassembly 14 may be replaced by a replacement subassembly by the simple expedient of removal of one ion emitter subassembly 14 and replacement with another by magnetic action of catch and release. The carbon brush 16 is protected within the recess 40 from damage due to handling and/or storage.

Although a recess receiving the ion emitter subassembly is presently preferred, other means may be employed to provide the intended alignment of the carbon brush. For example, the placement of the magnets could provide alignment, or, to take another exemplary embodiment, a round plate on a round body, not shown, may be employed to point the carbon brush emitter in any desired direction.

In the presently preferred embodiment, the ion emitter and wearable housing subassemblies 12, 14 each include magnetic conductive members to provide both removable attachment and the completion of the electrical circuit between the carbon brush emitter and the ionization circuit. In alternative embodiments in accord with the present invention, an electrical plug and receptacle or other connection arrangement, not shown, may be provided, separate from the magnetic members, to complete the electrical circuit. In alternative embodiments in accord with the present invention, a different number and arrangement of magnetically conductive and/or magnetic members may be provided by any arrangement suitable to removably attach the ion emitter and wearable housing subassemblies by magnetic action.

Figure 3:
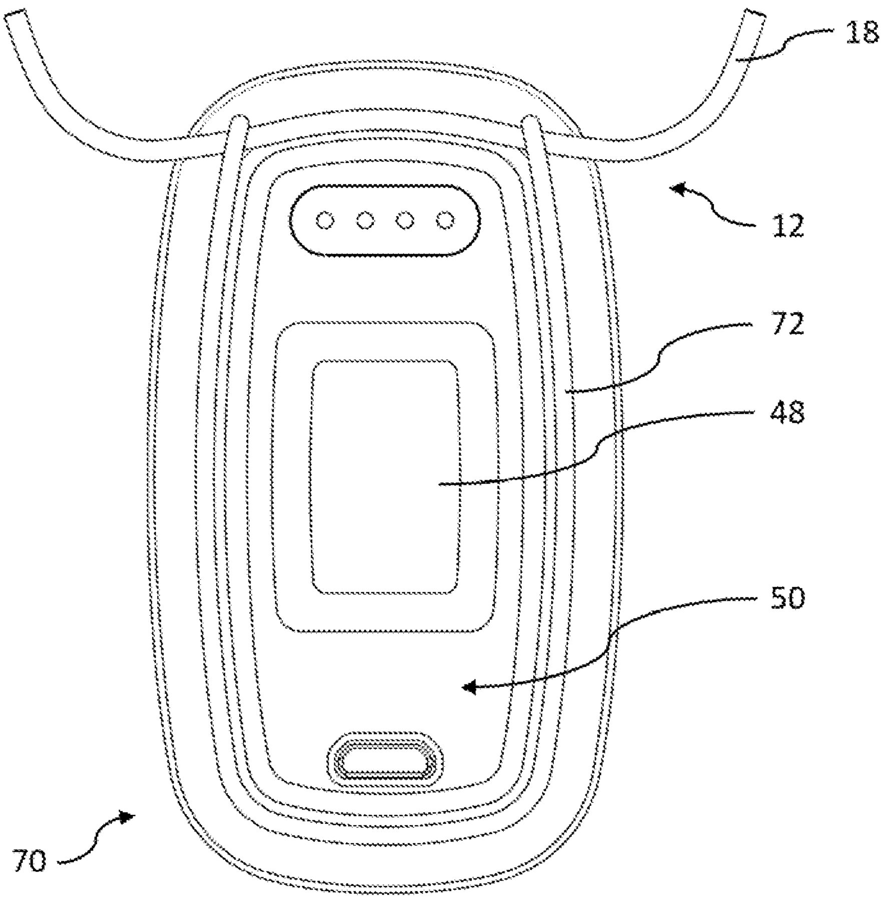
FIG. 3 back pictorial view of a portable rechargeable personal ionic air purifier in accord with the present invention.

Referring now to FIG. 3, generally designated at 70 is a back pictorial view of the portable rechargeable personal ionic air purifier in accord with the present invention. An elongated conductive member 72 is attached to the back surface 50 of the wearable housing subassembly 12 and electrically connected to electrical ground. In the presently preferred embodiment, the elongated conductive member 72 is shaped to provide a resilient conductive jaw external to the housing 12 at ground potential, although it could be differently configured without departing from the inventive concepts. The lanyard 18 is captured by the conductive member 72, which, because the conductive member is electrically grounded, is also electrically grounded, and which, when the lanyard 18 is worn about the neck, establishes the body of the user, not shown, at the same potential as the ground potential. The lanyard 18 is as easily removed as it is inserted into the resilient jaw.

Since no specialized plug ends and mating plugs are required, the lanyard 18 may be a simple loop of conductive material. The lanyard 18 may also be, for example, the user's own silver and/or gold neckwear. The resilient jaw provided by conductive member 72 of the presently preferred embodiment is capable of receiving an article of clothing between it and the confronting surface 50 of the wearable housing 12, which permits the mounting of the portable wearable housing 12 on an article of clothing, such as a T-shirt or sleeve or other article of clothing, not shown. When the article of clothing of whatever variety is removably received by the resilient jaw provided by the conductive member 72, the ground plate 48 contacts the confronting portion of the surface of the body of the user, which establishes the body of the user, not shown, at the same potential as the ground potential. The article of clothing is as easily removed as it is inserted into the resilient jaw provided by the conductive member 72. The conductive member may be variously configured to releasably grasp the lanyard and/or an article of clothing without departing from the inventive concepts.

The ground plate 48 in alternative embodiments may be employed to transfer ground to a desk mount, or a bed stand, or may even be used with a wristband, or armband, or other device for attaching the wearable housing to an intended body part, all not shown.

Figure 4A:
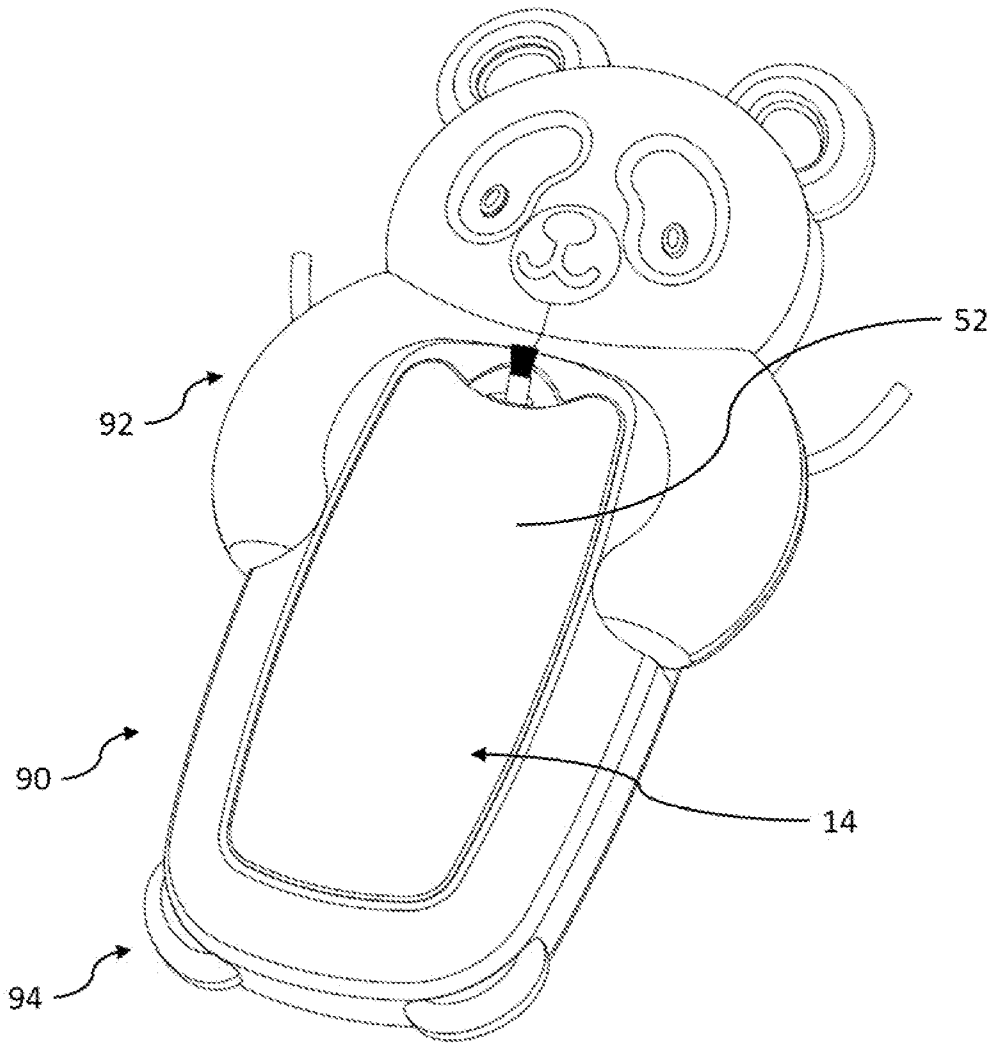
FIG. 4 shows in the FIGS. 4A and 4B thereof front and rear pictorial views of the portable rechargeable personal ionic air purifier with an exemplary decorative surround in accord with the present invention.
Figure 4B:
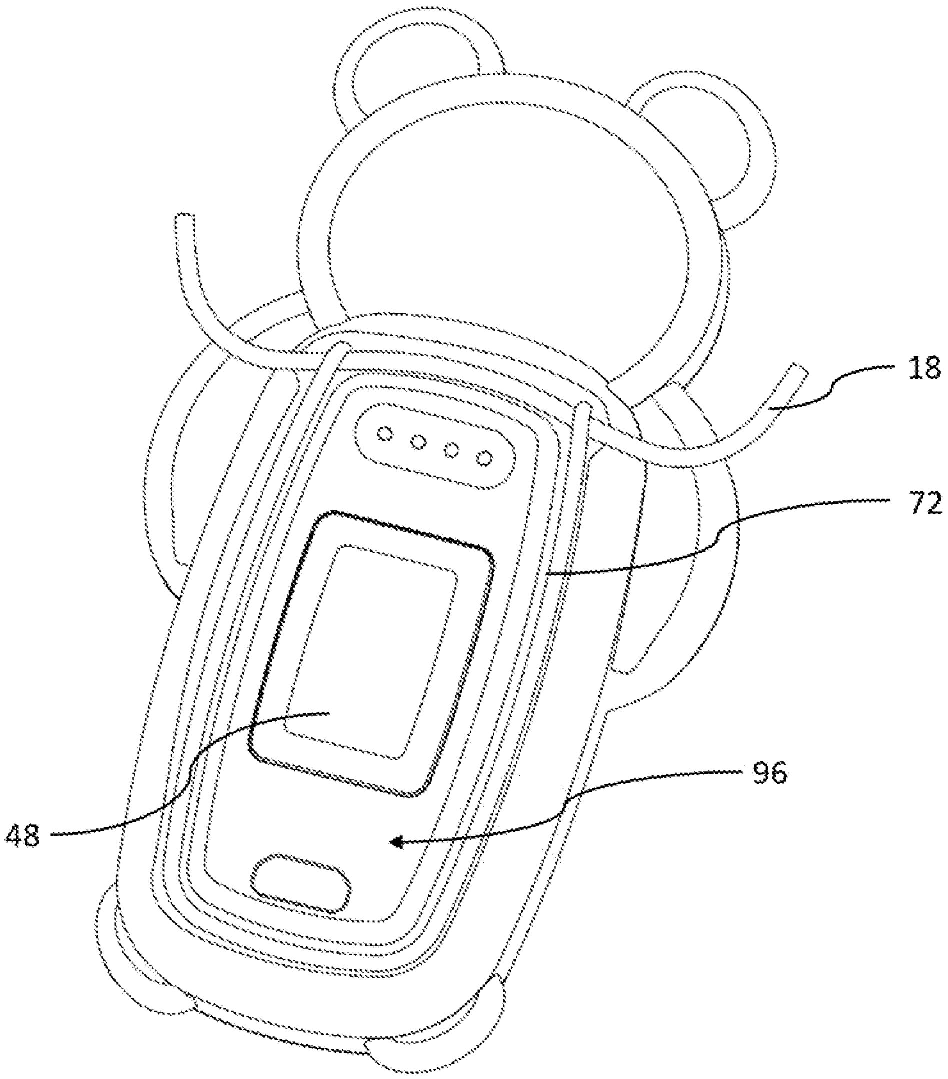

Referring now to FIG. 4A, generally designated at 90 is a front pictorial view of the portable rechargeable personal ionic air purifier 10 with an exemplary decorative surround generally designated 92 of silicone or other pliable or other material in accord with the present invention. The decorative surround 92 can be made colorful and can be shaped to resemble a bear, as shown, or any desired shape, or to define a logo, or to bear a pattern or graphics or to have textual features. A colorful, aesthetically shaped silicone or other surround makes the device more appealing to various populations, such as children, and the surround may also serve as a marketing tool.

As will be readily appreciated, the combination of text and graphics on the front of the cover member 52 of the ion emitter subassembly 14 and the shape and color and informational content of the decorative surround 92 can be integrated and cooperative, or independent, without departing from the inventive concepts.

Many modifications of the presently disclosed embodiment will become apparent to those of skill in the art without departing from the inventive concepts.

What is claimed is:

1. A personal air space cleaner for use with an electrically conductive lanyard that is worn about a human neck to clean air of particulate pollutants, comprising:

a wearable housing;

an electronic circuit that is powered by battery power and that provides both ground potential and an excitation potential;

an ion emitter connected to said electronic circuit that is excited to emit ions when it is energized at said excitation potential;

a resiliently biased electrically conductive jaw member attached to said wearable housing that is operative to resiliently open so as to receive said electrically conductive lanyard within said resiliently open jaw member and that is operative to resiliently close so as to mechanically capture said electrically conductive lanyard within said resiliently closed jaw member;

wherein said resiliently biased electrically conductive jaw member is connected to said ground potential and is cooperative with said electrically conductive lanyard to establish said neck at said ground potential when said electrically conductive lanyard is captured in said resiliently biased jaw member.

2. The personal air space cleaner of claim 1, wherein said electronic circuit and said ion emitter are attached to said wearable housing.

3. The personal air space cleaner of claim 1, further including an electrically conductive lanyard.

4. A personal air space cleaner for use with an article of clothing worn by a human body to clean air of particulate pollutants, comprising:

a wearable housing;

an electronic circuit that is powered by battery power and that provides both a ground potential and an excitation potential;

an ion emitter connected to said electronic circuit that is excited to emit ions when it is energized at said excitation potential;

first and second members mounted to said wearable housing;

wherein said first member mounted to said wearable housing is a resiliently biased jaw member that is operative to resiliently open so as to receive said article of clothing in the resiliently biased jaw member and that is operative to resiliently close so as to mechanically capture said article of clothing therewithin; and wherein said second member is an electrically conductive second electrode member configured for contact with said human body that is connected to said ground potential and cooperative with said first resiliently biased jaw member to establish said human body at said ground potential when said article of clothing is captured in said resiliently biased jaw member.

5. The personal air space cleaner of claim 4, wherein said resiliently biased jaw member is electrically conductive and electrically connected to said ground potential.

6. The personal air space cleaner of claim 4, wherein said electronic circuit and said ion emitter are attached to said wearable housing.

* * * * *